United States Patent [19]

Byers et al.

[11] Patent Number: 4,962,501
[45] Date of Patent: Oct. 9, 1990

[54] BUS DATA TRANSMISSION VERIFICATION SYSTEM

[75] Inventors: Larry L. Byers, Apple Valley; James H. Scheuneman, St. Paul; Joseba M. Desubijana, Minneapolis, all of Minn.

[73] Assignee: Unisys Corporation, Blue Bell, Pa.

[21] Appl. No.: 244,187

[22] Filed: Sep. 13, 1988

[51] Int. Cl.$^5$ .............................................. G06F 11/10
[52] U.S. Cl. ....................................... 371/51.1; 371/3
[58] Field of Search .................. 371/3, 29.1, 49.1, 51.1

[56] References Cited

U.S. PATENT DOCUMENTS 4,414,669 11/1983 Heckelman et al. ................ 371/49.1
4,670,876 6/1987 Kirk ......................................... 371/3

*Primary Examiner*—Charles E. Atkinson
*Attorney, Agent, or Firm*—John B. Sowell; Glenn W. Bowen; Robert S. Bramson

[57] ABSTRACT

A plurality of transmitting and receiving elements are coupled between read and write buses. The communication paths which connects the tranmitting and receiving elements to the buses are each provided with a fault indicating circuit in series therewith. Each of said fault indicating circuits have logic gating means which include a bit register for each of the bits of a data byte and a parity bit. The output of the bit register means are coupled to isolation drivers which in turn are connected to parity checking circuits and the buses for indicating errors which occur in the bytes of a data word without degrading or delaying data transmission to and from said read and write buses.

6 Claims, 5 Drawing Sheets

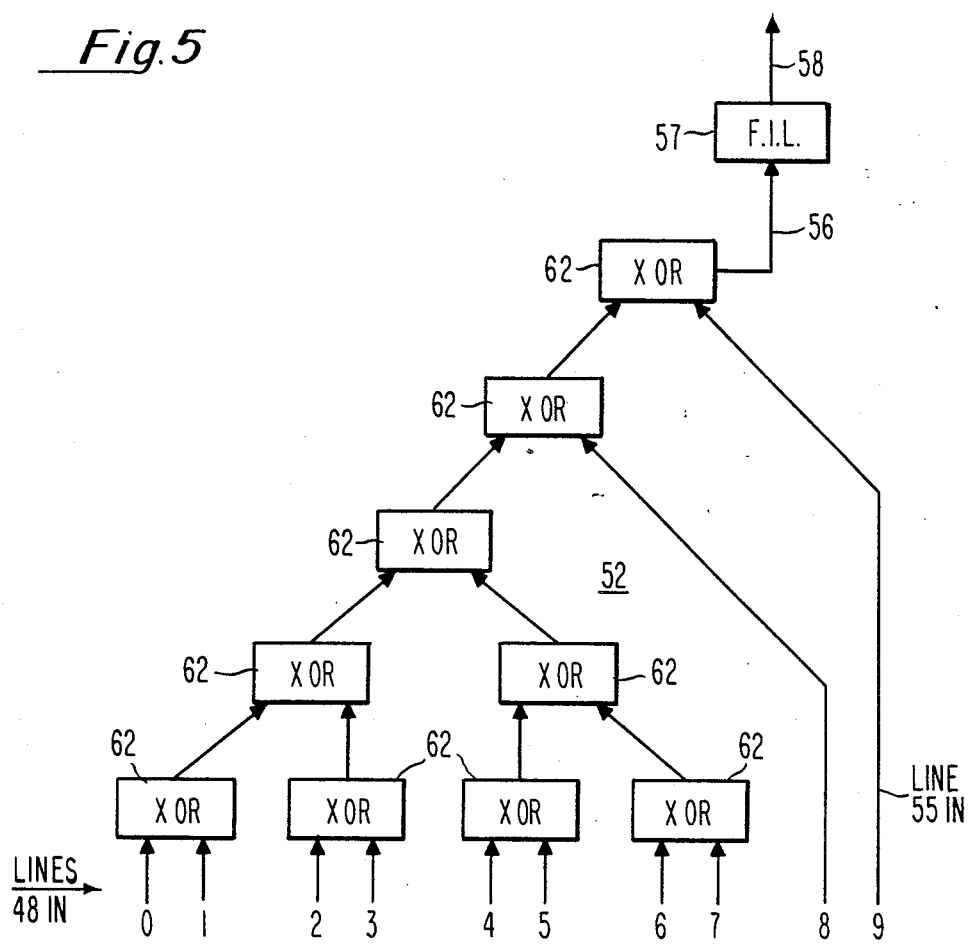

BUS DATA TRANSMISSION VERIFICATION SYSTEM

BACKGROUND OF THE INVENTION

1. Field of the Invention

The present invention is related to a system for checking data parity errors in real time during transmission of data from a transmitter to a bus and again in real time during transmission of data from a bus to a receiver. More particularly, the present invention is related to novel fault indicating circuits which are placed in series between elements of a high-speed storage unit and the read and write buses for detecting errors in data transmission to and from the elements of the storage unit. The fault indicating circuits are capable of indicating the element at fault, the slice or block of the element at fault and the type of fault even though the elements are hard wired or connected to the read/write buses.

2. Description of the Prior Art

Modern high-speed main frame computers employ parity checking circuits and parity checking systems when accessing information from high-speed cache memories. Such systems are described in U.S. Pat. No. 4,168,541 Filed also in U.S. application Ser. No. 07/241,421 7 Sept. 1988. entitled High-Speed Partition Set Associative Cache Memory. This latter Application shows and describes logic for identifying the block or array in which a data parity error has occurred when memory is accessed and the data is placed on an output bus or transmission line. Thus, the parity checking circuits can identify a parity error associated with the information being transmitted from a particular block or card which will enable maintenance personnel to be able to replace the complete storage array board and/or disable a portion of the memory if the memory remains in operation.

Main storage units for high-speed main frame computers that employ separate read and write buses also check the parity of the data being transmitted onto the read or write bus. When the elements of the main storage units are hardwired or connected to the read or write bus, it is possible to identify the element (card or board) which generated the faulty data but prior art parity check circuits do not identify faults which are generated by the circuitry associated with the board or card.

Modern high-speed computers employ storage elements on cards or boards which are densely populated with semiconductor devices. Such storage elements divide words into bytes which are associated with a single board. Prior art parity checking circuits are adapted to indicate the card or plugable storage element which generated the errors if the error checking circuits are not at fault, but do not provide means for indicating whether the error checking circuit themselves or the logic circuitry portion of the board or card generated the error signal.

High-speed main frame computers are being operated at clock cycles approaching thirty (30) nanoseconds (n sec). The clock cycles are subdivided into subdivisions or phases which are so small that very few logic decisions can occur during a clock phase of a high-speed clock. For example, switching times of high-speed logic elements are now approaching one nanosecond and clock phase times are well under ten nanoseconds which permits very few complex logic decisions during a clock phase cycle. Further, delays in the bus paths and line communication paths consume a very large portion of any clock phase time during a clock cycle.

There is currently a need for a high-speed parity checking circuit which can be operating during real transmission time of the data to and from a bus without delaying the transmission and reception of the data.

SUMMARY OF THE INVENTION

It is a primary object of the present invention to provide a novel bus data transmission verification system.

It is another primary object of the present invention to provide a novel fault indicating circuit.

It is another primary object of the present invention to provide a fault indicating circuit for parity checking all of the bytes of a data word when being transmitted to or from a data bus.

It is another object of the present invention to provide a fault indicating circuit for identifying the board or card or the circuitry associated with the board or card which produces a parity error.

It is another object of the present invention to provide a fault indicating circuit for identifying a faulty transmitter, a faulty receiver or faulty associated circuitry.

It is another object of the present invention to provide novel fault indicating circuitry that operates in real time without delaying the transfer of data to and from a main storage unit.

It is yet another object of the present invention to provide novel fault indicating circuitry that performs a parity check of bytes of a word and further checks to determine if the fault indicating circuitry produce the error.

According to these and other objects of the present invention there is provided in a main storage unit a plurality of transmitting cards and a plurality of receiving cards connected to associated read and write buses. Individual fault indicating circuits are connected in the path of the data being transmitted to the read and write buses and from the read and write buses to the associated receivers. The fault indicating circuits comprise gating means for establishing a predetermined parity check of each of the bytes with a parity check bit and further provides fault indication and verification circuitry for determining whether the fault or error occurred in the fault indicating circuitry or in the card or board producing the data.

BRIEF DESCRIPTION OF THE DRAWINGS

FIG. 5 is a detailed block diagram of a preferred embodiment bit parity comparison circuit in the form of an exclusive OR tree;

FIG. 6 is a truth table illustrating how the fault indicating latch information in the fault indicating circuits is utilized.

DESCRIPTION OF THE PREFERRED EMBODIMENT

Figure 1:
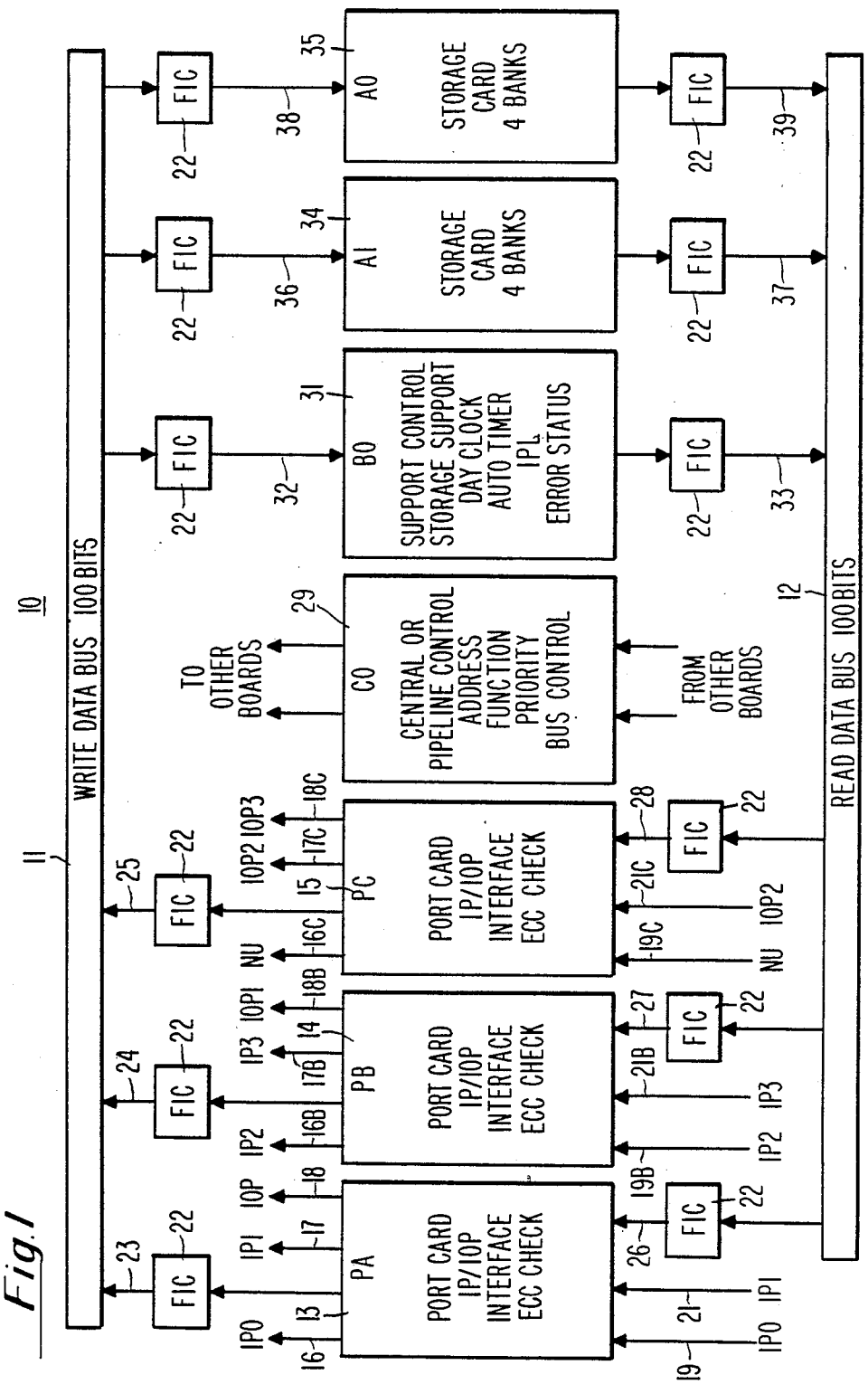
FIG. 1 is a block diagram of a main storage unit of a high-speed main frame computer showing the environment of the novel fault indicating circuits.

FIG. 1 is a block diagram of a main storage unit 10 of a main storage complex of a main frame computer. The main storage unit 10 is typical of a sixteen mega word main storage unit of the type which is duplicated in large main frame computers. The main storage unit 10 comprises seven plugable and removeable card circuit boards or cards which are coupled to a main write data bus 11 and a main read data bus 12. The three left most cards or boards 13, 14 and 15 are input/output interface port cards which communicate with the main processor and peripheral equipment. For this purpose, lines 16, 17 and 18 from port card 13 are lines which connect to instruction processor zero (IP0), instruction processor 1 (IP1) and one of the input/output processors. Similar lines 19 and 21 are lines coming in from the instruction processors. Other input/output processor (IOP) lines to port card 13 are not shown. Similarly, line 16B, 17B and 18B from port card 14 are connected to different IPs and IOPs. Lines 16C, 17C and 18C from port card 15 are connected to yet different IPs and IOPs so that lines from port cards 13, 14 and 15 can connect to up to eight instruction processors. The input lines 19B and 19C and 21B and 21C connected to port cards 14 and 15 respectively, are representative of up to eight input lines which can connect to the three port cards 13, 14 and 15. Port cards 13, 14 and 15 are shown having output lines 23, 24 and 25 connected to write bus 11. Connected in series therewith are the novel fault indicating circuits 22 (FIC). Similarly, input lines 26, 27 and 28 from read bus 12 to the port cards 13, 14 and 15 have connected in series therewith the same novel fault indicating circuits 22 (FIC) which will be explained in detail hereinafter.

A central or pipeline controller 29 (CO) occupies one of the seven cards and is connected via control lines to the other six cards or boards to perform sequencing and control functions. Support control card 31 (SO) is basically a utility and auxilliary control card which supplies timing functions and maintenance functions. Support control card 31 also contains error status and logic support functions and is connected to buses 11 and 12 via lines 32 and 33 which have in series therewith the aforementioned fault indicating circuits 22.

Storage cards 34 and 35 are preferably dynamic RAM memory cards having four banks of two mega word storage units each for a total of eight mega words each. The individual words are addressed by the central controller 29 via an address bus not shown. Storage card 34 is provided with an input line 36 connected to write bus 11 and an output line 37 connected to a read bus 12. Connected in series therewith are the novel fault indicating circuits 22. Similarly, storage card 35 is provided with input line 38 and output line 39 which are also provided with series connected fault indicating circuits 22.

The data words on write bus 11 have a parity check bit for each byte of the word which enables the fault indicating circuits 22 to determine faults at the byte level for information being transmitted to the write bus 11. The data word and a word parity bit along with eight check bits are stored in memory. Information being supplied to read data bus 12 from the storage cards 34 and 35 generate the parity bit for each byte of a word being transmitted to the read data bus 12. Verification for the proper regeneration of the byte parity bits is confirmed by comparing generated byte parity bits against the stored data bytes which are stored with each word in the storage cards 34 and 35. All data words entering port cards 13, 14 and 15 via lines 26, 27 and 28 have parity check bits associated with each byte of each word. Thus, each byte of each word is checked, leaving a port card and entering a port card to provide a double check on all information entering and leaving a bus.

Figure 2:
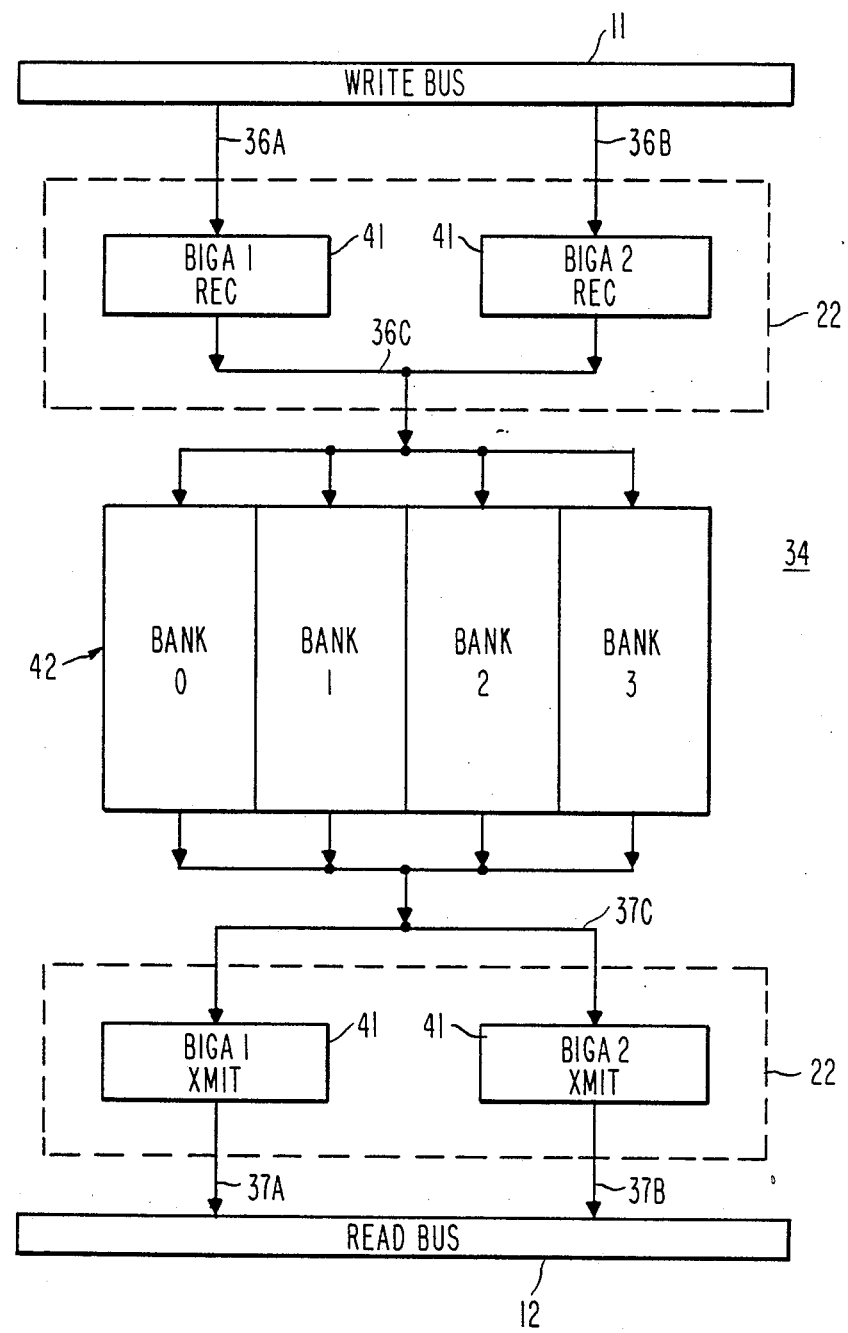
FIG. 2 is a simplified block diagram of a storage element or card connected between a read bus and a write bus showing the location of the novel fault indicating circuits.

Refer now to FIG. 2 showing a simplified block diagram of storage card 34 connected to write bus 11 and read bus 12 through fault indicating circuits 22 which comprise a pair of identical bus interface gate arrays 41 (BIGA). Data words on write bus 11 may be designated as an even word which is transmitted on line 36A to the first gate array 41. The odd words on line 36B are transmitted to the second gate array 41 for check processing. The output of the processed odd and even words on line 36C may be stored in any of the banks 42 designated banks 0 to 3. The odd and even words stored in banks 0 to 3 (which store two mega words each) appear as outputs on line 37C. The words from memory are again divided into odd and even data words for processing by first and second gate arrays 41 which comprise the fault indicating circuit 22. The even and odd words on lines 37A and 37B from the first and second gate arrays 41 are applied to read bus 12 for transmission to one of the three port cards 13, 14, 15 shown in FIG. 1. FIG. 2 illustrates how the fault indicating circuits are implemented in the form of a pair of identical gate arrays 41.

Figure 3:
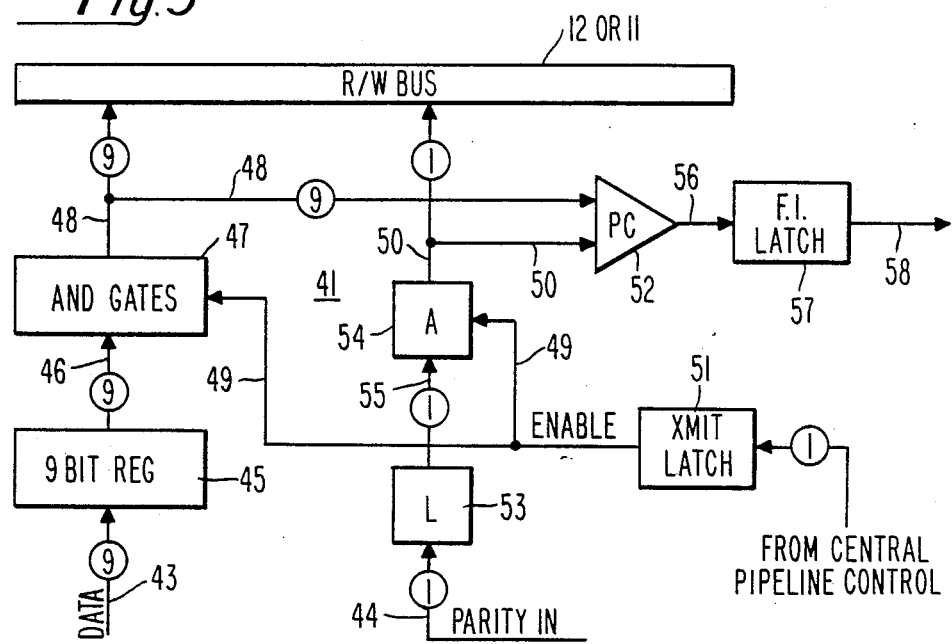
FIG. 3 is a simplified block diagram of one of the ten logic circuits in a fault indicating circuit.

Refer now to FIG. 3 showing in simplified block diagram one of the five logic circuits which comprise a gate array 41 or one of the ten logic circuits which comprise a fault indicating circuit 22. The data in line 43 comprises one byte of a word which comprises five bytes. With each byte of data on line 43 there is an accompanying parity in check bit on line 44. When the data in is being generated from one of the storage cards 34 or 35, the data will be applied to the read data bus 12 (shown as a read/write bus 12 or 11). The data on line 43 is first applied to a 9 bit register 45. Ten such registers are required for a fault indicating circuit 22. The parallel data output on line 46 from register 45 is applied to a bank of nine AND gates 47 to produce parallel outputs on lines 48 when enabled by signals on enable line 49 from the transmit latch 51. The transmit latch 51 stores the transmit signal from the central pipeline controller 29. An individual latch 51 is required for each of the bytes of data on input lines 43. The data applied to input line 43 is simultaneously transmitted to read bus 12 via lines 48 and simultaneously in parallel format to the parity check circuit 52. The parity check bit on line 44 is applied to parity latch 53 and transmitted to AND gate 54 via line 55. The output of AND gate 54 on line 50 is applied as a tenth bit input to the parity check circuit 52 and simultaneously to the read bus 12. The output of the parity check circuit on line 56 is held in the fault indicator latch 57. Five such fault indicating latches 57 are required for each even and each odd word. The information set in these latches is transmitted to the card fault detecting logic (not shown). It will require five logic circuits of the type shown in FIG. 3 for each data word and for each gate array 41. A gate array 41 is capable of handling a complete fifty bit data word.

The information produced by the gate array is held in five fault indicating latches 57. The fault indicating circuits 22 shown in FIGS. 1 and 2 require two gate arrays 41, thus will require ten of the logic circuits and ten of the fault indicating latches of the type shown in FIG. 3. The 50 bits of a data word appearing on lines 43 and 44 are transmitted in parallel to the read bus 12 with one logic switching time delay in register 45 and one delay pulse enable time at gates 47. As the information on line 48 is being applied to the read bus 12, it is also being applied in parallel to the parity check circuit 52 without any delay, thus, the parity check circuit and the fault indicating circuit 22 may be operated in real time without any significant delay of data to and from the storage cards 34 and 35.

Figure 4:
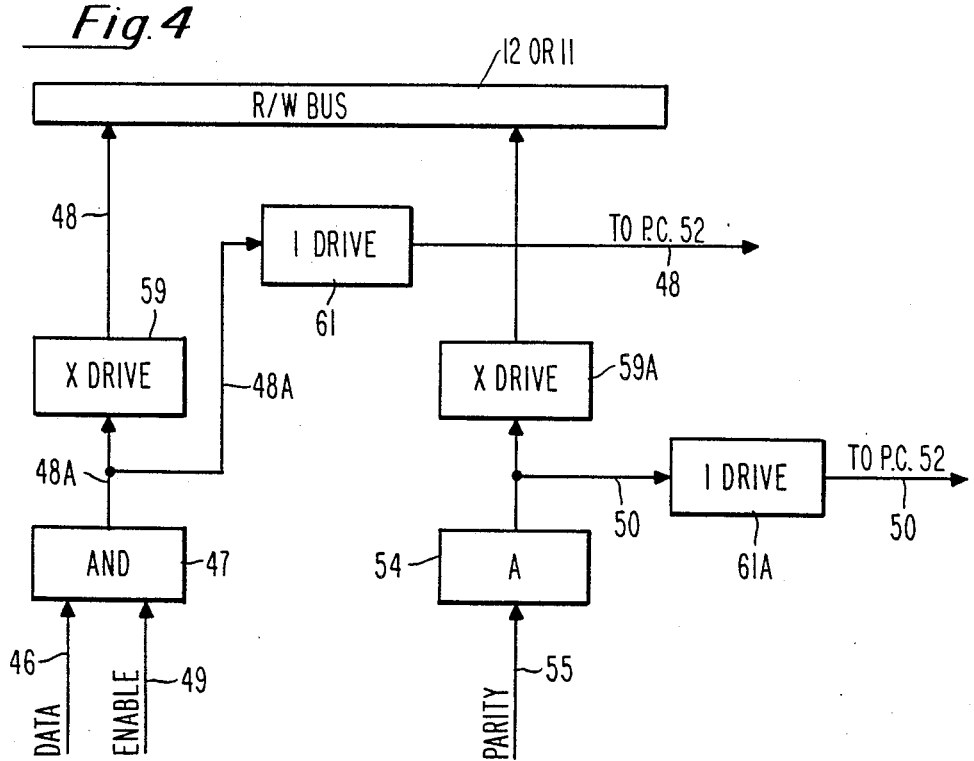
FIG. 4 is a detailed block diagram of one of the single bit AND gate circuits in the data path of the AND gates in FIG. 3.

Refer now to FIG. 4 showing a more detailed block diagram of one of the AND gates 47 and associated logic in the gate array 41 of FIG. 2. The data on line 46 and the enable pulse on line 49 are applied to one of the nine AND gates 47 to produce an output on line 48A. The output on line 48A is applied to an external driver 59 and an internal driver 61 to produce the aforementioned nine outputs on lines 48 which are applied to the read bus 12 and to produce the input to the parity check circuit 52. It will be appreciated that the drivers 59, 59A and 61, 61A may be each implemented with a separate driver transistor. The delay time for the data on lines 43 and 46 being transmitted to read bus 12 can be reduced to approximately one nanosecond and the parity check circuits 52 are operated during this real transmission time. It will be noted that the signal on line 48A is coupled through its driver 61 to the parity check circuit 52 before being applied to driver 59. The novel parity check circuits perform their check operation on all portions of the circuitry between the card and the bus except for the single external driver 59.

Refer now to FIG. 5 showing a more detailed block diagram of the preferred embodiment parity check circuit 52. Lines 0 to 8 are the data input lines 48 shown in FIGS. 3 and 4. The parity input line 55 is shown in FIG. 3. The data and parity bit on lines 0 to 9 are applied to high-speed ECL exclusive OR gates 62 to produce a fault indication or NOT fault indication signal on line 56 which is applied to the fault indication latch 57. By employing high-speed logic gates 62 the logic output on line 56 can be produced in approximately 675 pico seconds after data input, thus, the parity check circuit is operated in real time while the information on line 48 is being applied to the read bus 12. It will be appreciated that the twelve fault indicating circuits 22 shown in FIG. 1 are placed in series in the input and output lines between the six cards and the two data buses and operate in real time without affecting performance of the main storage unit 10.

Refer now to the simplified truth table shown in FIG. 6. The caption or heading for the two columns indicates that the even word of odd word gate arrays 41 at the transmitter and the receiver may have any one of their five fault indicating latches 57 locked up indicating an error condition which is capable of isolating the type of error and the location of the error. For example, when a condition C1 occurs, one of the gate arrays 41 has had one of its five latches latched up showing a fault indication at the transmitter and the information that was passed to the bus has been received at one of the receivers. The same even word or odd word being transmitted from the bus to the receiver has one of its five latches in its gate array latched up indicating a fault condition. The fault summary indicates that the transmitted data is at fault. When the condition C2 occurs, there was no fault indication of the data being tansmitted to the bus and there was a fault indication of the data being transmitted from the bus to the receiver. The fault summary indicates that the bus or the receiver is at fault. When a condition C3 occurs there was a fault indication when the data was transmitted from the transmitter to the bus and no fault indication of the data being transmitted from the bus to the receiver. The fault summary indicates that the transmitted data probably has a multiple bit error. Fault summary data presented in truth table of FIG. 6 is sufficient to identify the card or board on which the error occurs because only one transmitter and one receiver operates at the same time with the two buses during any clock cycle. Not only is it possible to determine which card or board is at fault but it is possible to determine whether the fault exists in the fault indicating circuitry 21 between the transmitter and the bus and the bus and the receiver. Even though the connections to the buses from the transmitters are hard wired to the bus, the bus connection is isolated through the aforementioned external driver 59 so that the logic circuitry for each of the gate arrays is individually checked making the assumption that the external driver 59 does not exist in the circuitry. Further, the information stored in fault indicating latches 57 for each of the bytes of each of the words can be locked up and held when a fault indication occurs so that the maintenance controller can read out the information in the latches 57 and determine which portion of a board or card has produced the error indication.

Figure 7:
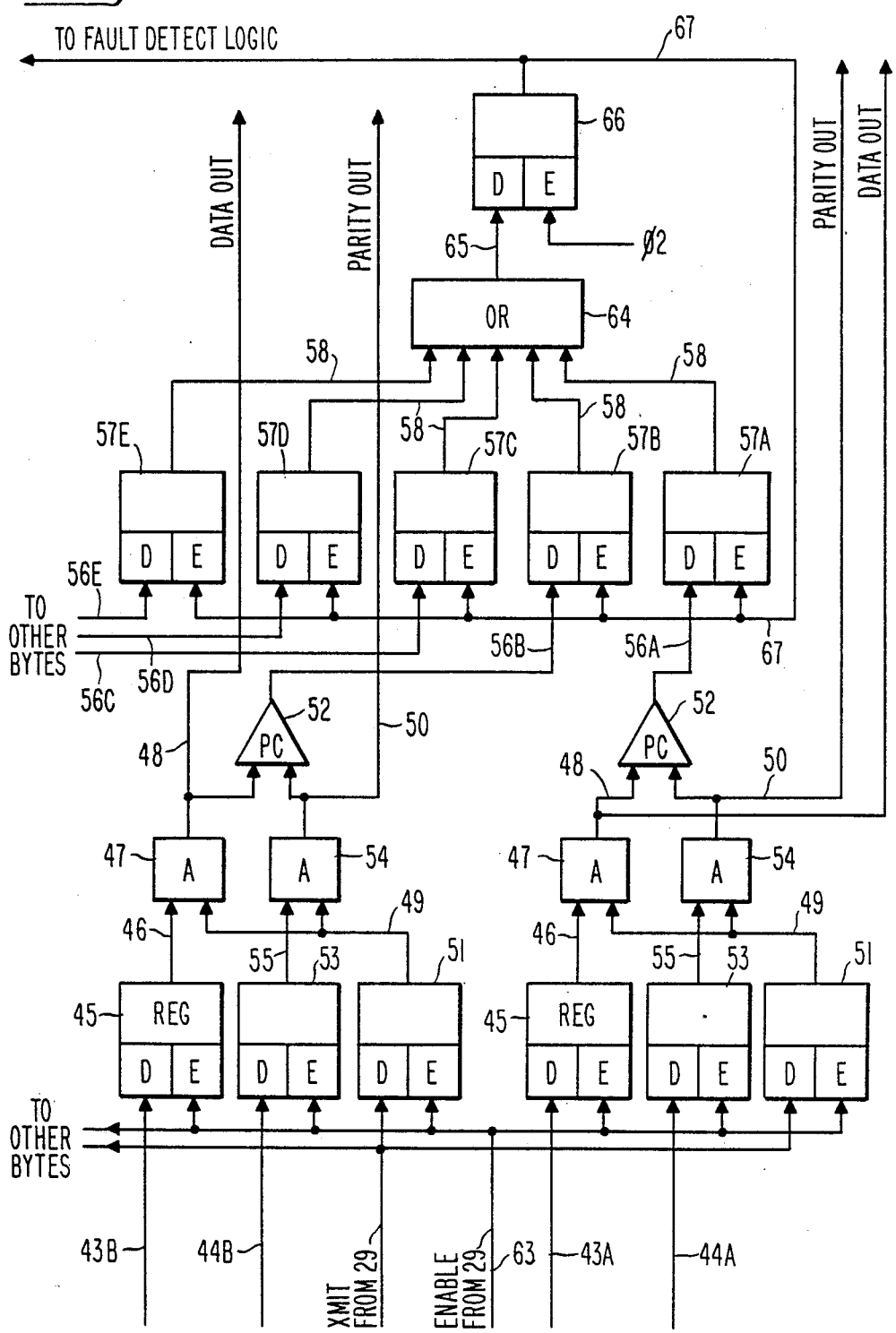
FIG. 7 is a detailed schematic block diagram of one of the two logic circuits of a fault indicating circuit.

Refer now to FIG. 7 showing a more detailed schematic block diagram of the fault indication circuit gate array 41. For purposes of illustration only, two of the five modules or bytes are being illustrated and all five of the fault indication latches 57 are shown for a data word. Data from the first byte of a data word appears on line 43A and is being applied to the aforementioned nine bit register 45. Similarly, the second byte of the data word is being applied to line 43B and its nine bit register 45. In similar manner, the parity bit on lines 44A and 44B for the first and second bytes of the data word are shown being applied to their latches 53. The data output from registers 45 on lines 46 are applied to the bank of AND gates 47 to produce the data word on output line 48 which is applied to either the read or write bus. Similarly, the parity data in register 53 and on output line 55 is gated through AND gate 54 to produce the parity data bit on line 50 as explained hereinbefore. The data bits and parity bits on lines 48 and 50 are applied to the parity check circuits 52. The output from the parity check circuits 52 on lines 56 is applied to one of the five fault indicating latches 57A through 57E. The inputs to the fault indicating latches 57 on lines 56A to 56E appear as outputs on lines 58 and are applied to OR gates 64 to produce fault indicating signal outputs on line 65. The fault indication signal on line 65 is applied to a fault indicating hold latch 66 during phase two of the clock cycle to produce a hold or enable signal on line 67 which is applied to the enable inputs of the latches 57A to 57E. The signal on line 67 indicates that a fault or error has occured in one of the latches and is also indicative of a card error. The signal on line 67 is applied to the fault detection logic (not shown). As explained hereinbefore, the maintenance controller of the central processing unit can then scan the latches 57A to 57E to determine which of the bytes of the data word generated the error signal on line 67. Thus if a single error occurs in one of the latches 57A to 57E when the latches are scanned the byte where the error occurred will be indicated. When two errors occur in two different bytes, the novel error detecting and verification circuit still indicates an error on line 67 and both errors may be detected when the latches 57A to 57E are scanned by the maintenance controller.

Having explained a preferred embodiment of the present invention, it will be understood that a plurality of cards or boards are connected to read and write buses 12, 11 and when errors occur it is possible to detect not only the board but the latch associated with the error within the board or card. Even though the individual cards are plugged or hard wired board into the buses it is still possible to isolate individual cards and their associated circuitry from other cards and their associated circuitry. It is possible that single bit errors being generated by the transmitter or the receiver may be corrected without having to block out the portion of a card generating the error. The maintenance controller maintains a history of all errors generated including correctable single bit errors whose causes are corrected during subsequent maintenance. Such maintenance controllers capable of interfacing with the present invenntion are well known and have been used with large main frame computers sold by the Sperry Corporation under models 1100/80 and 1100/90.

What we claim is:

1. A bus data transmission verification system, comprising:
    a read data bus,
    a write data bus,
    a plurality of transmitting and receiving card elements, each being coupled between said data buses,
    input and output communicaiton path means coupling said card elements between said data buses,
    fault indicating circuit means coupled in series in said input and the output comunication paths means between each of said transmitting and receiving elements and said buses,
    said fault indicating circuit means comprising logic gating means for parity checking a plurality of data bytes of a data word,
    said logic gating means for parity checking having a plurality of parallel connected bit registers,
    each said bit register having a data byte input and a parity bit input connected thereto,
    each said logic gating means having a parity check circuit coupled to the output of each said bit register for generating error signals indicative of byte errors, and
    said fault indicating circuit means comprising storage means coupled to the output of said parity checking circuits for storing signals indicative of data byte errors in said data word.

2. A bus data transmission system as set forth in claim 1 wherein said logic gating means further includes AND gate means coupled between said bit registers and said parity checking circuits.

3. A bus data transmission system as set forth in claim 2 wherein said AND gate means are provided with an enable input coupled to a central pipeline controller.

4. A bus data tramission system as set forth in claim 3 wherein the output of said AND gate means is coupled to an external isolation driver having its output coupled to said read or said write bus.

5. A bus data transmission system as set forth in claim 3 wherein the output of said AND gate means is coupled to an internal isolation driver having its output connected as an input to said parity checking circuit.

6. A bus data transmission system as set forth in claim 1 which further includes a central pipeline controller coupled to said fault indicating means for determining the element and type of error detected by said parity checking circuit.

* * * * *